United States Patent [19]
Giffin

[11] 4,222,577
[45] Sep. 16, 1980

[54] CENTERING AND HOLDING DEVICES FOR POTTER'S WHEELHEAD

[76] Inventor: Brian K. Giffin, 890 Willowbrook Ave., Boulder, Colo. 80302

[21] Appl. No.: 925,924

[22] Filed: Jul. 19, 1978

[51] Int. Cl.³ .................. B23Q 3/06; B23B 31/00
[52] U.S. Cl. ............................ 279/114; 269/156; 279/1 L; 279/1 Q; 279/1 SJ; 425/263; 425/459
[58] Field of Search ............ 279/114, 115, 116, 1 L, 279/1 Q, 1 SJ, 17, 1 J; 269/156, 233, 275; 425/263, 459; 268/346 A

[56] References Cited

U.S. PATENT DOCUMENTS

| | | | |
|---|---|---|---|
| 82,627 | 9/1868 | Munger | 279/114 |
| 167,127 | 8/1875 | Sandbach | 269/233 X |
| 648,763 | 5/1900 | La Barge | 279/114 X |
| 2,977,128 | 3/1961 | Judelson | 279/114 X |
| 3,814,448 | 6/1974 | Buck | 279/1 J |
| 3,994,659 | 11/1976 | Takahashi | 269/156 X |

FOREIGN PATENT DOCUMENTS 543733  3/1942  United Kingdom .............. 279/1 Q Primary Examiner—Z. R. Bilinsky
Attorney, Agent, or Firm—Russell H. Clark

[57] ABSTRACT

The centering and holding device of the invention is a relatively simple but practical piece of equipment for attachment to a potter's wheelhead for centering and holding the pot such as a vase, bowl, plate or the like on the said wheelhead. The top plate of the device is provided with sliding arms for engaging and holding the pot and the body portion of each arm extends through the top plate to project below for co-action with spiral grooves formed in the surface of the bottom plate. When the plates are rotated relatively to each other the arms move radially and to a like extent.

1 Claim, 22 Drawing Figures

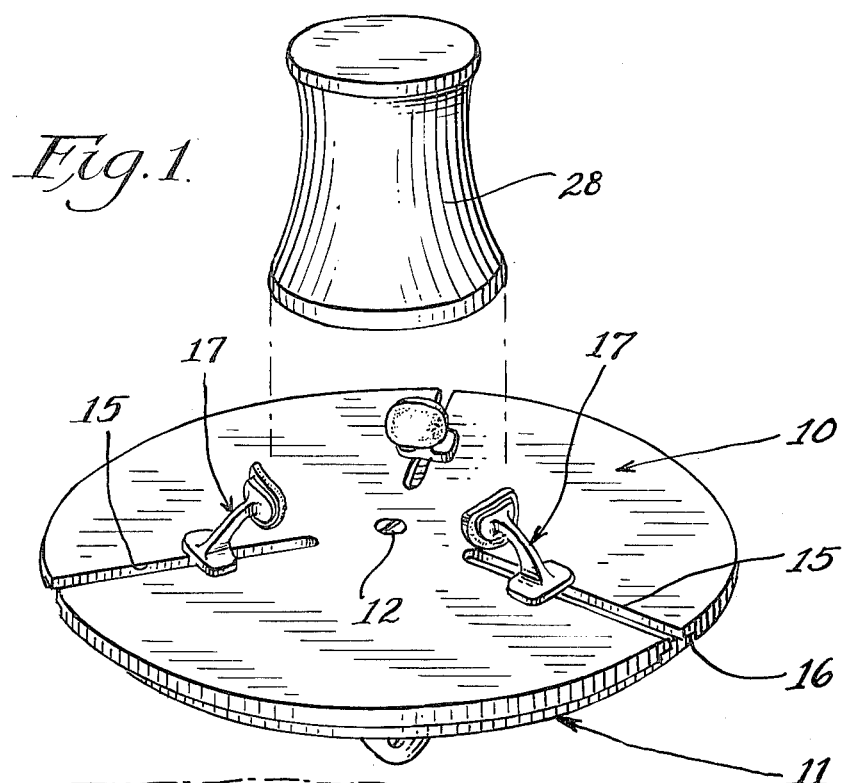
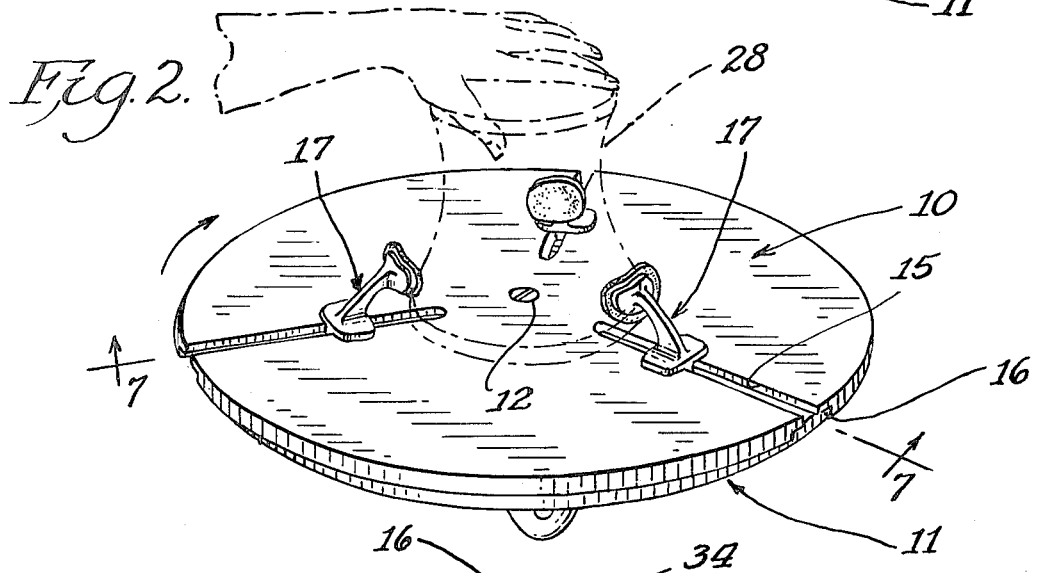
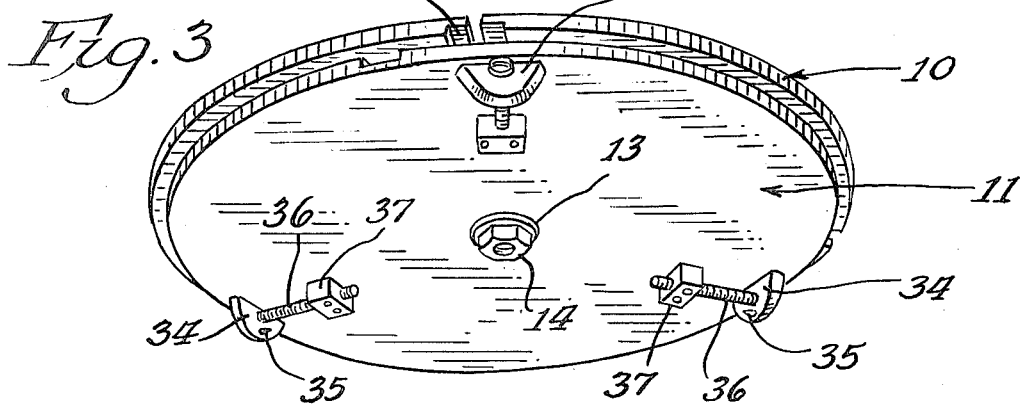

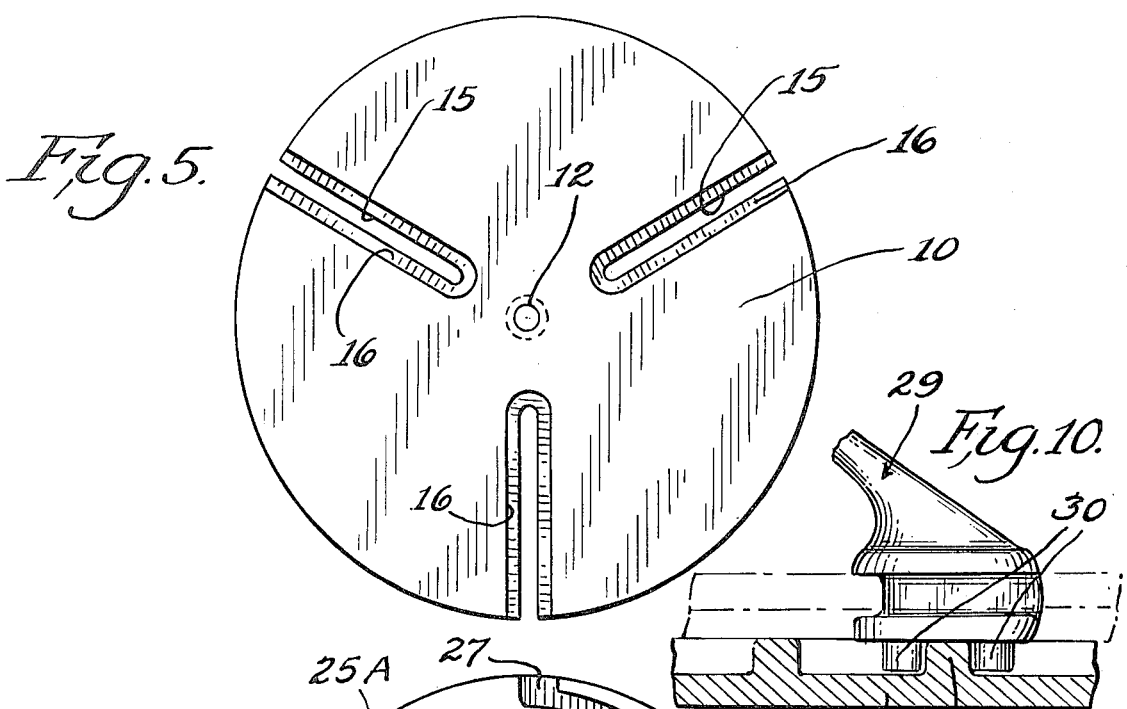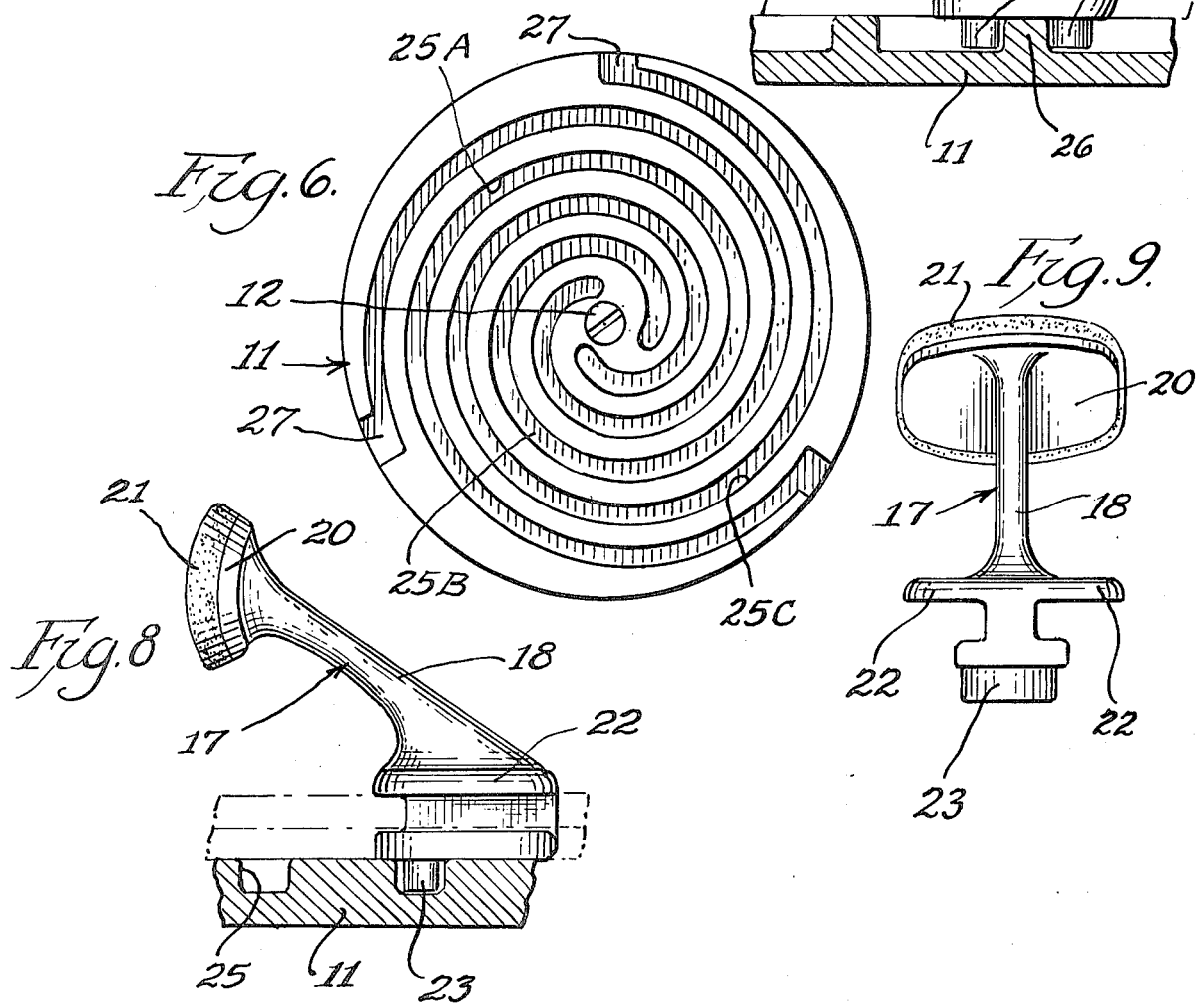

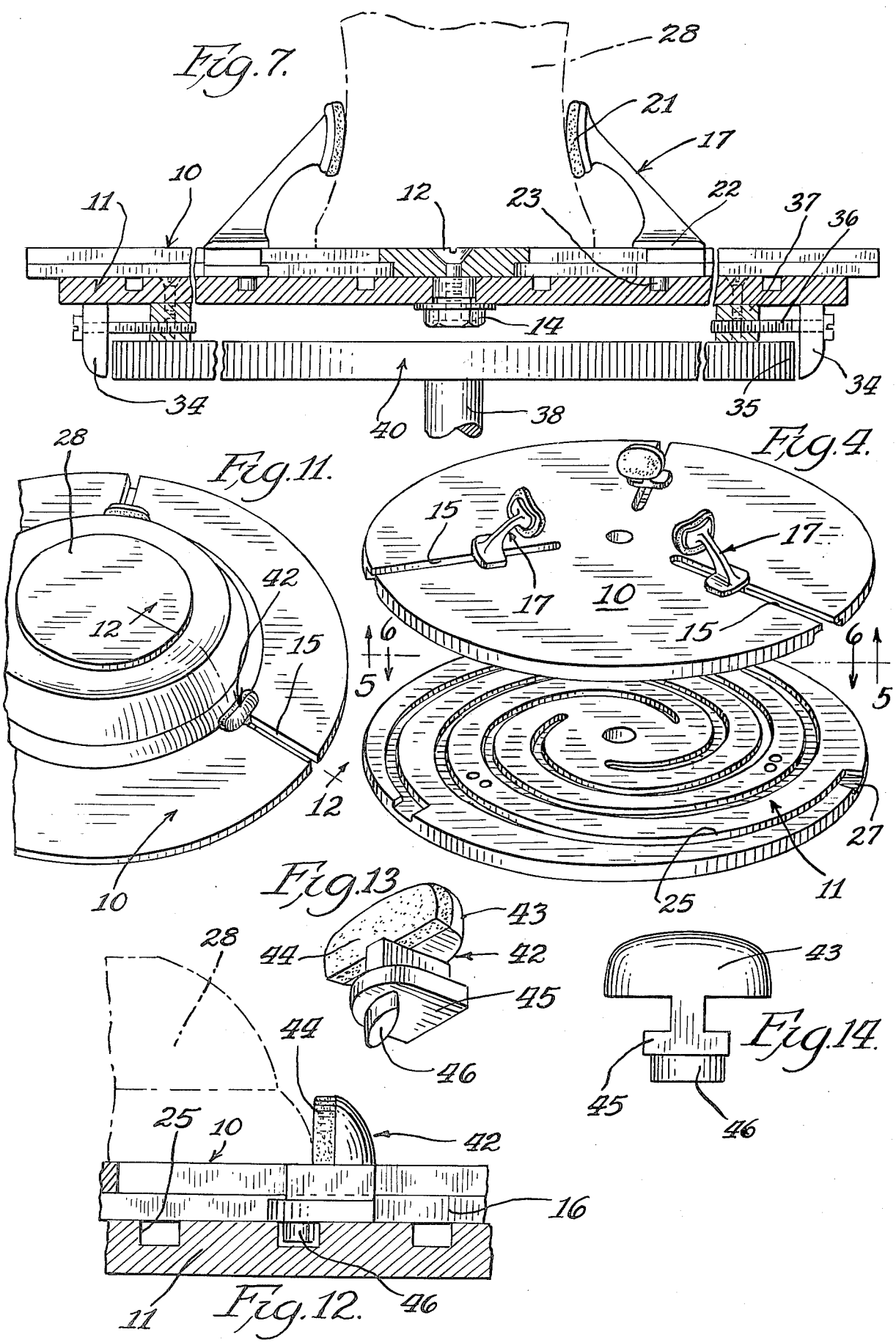

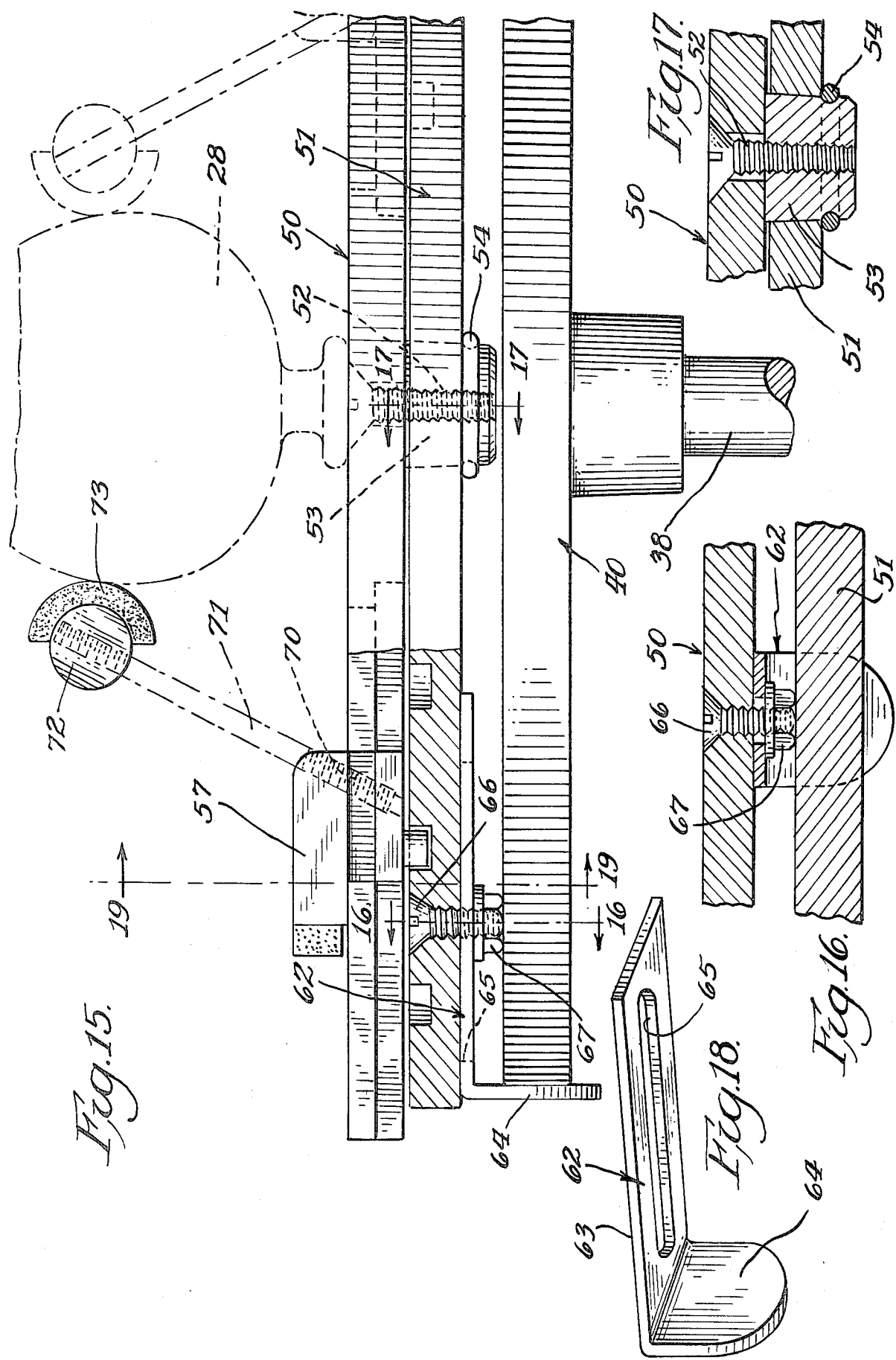

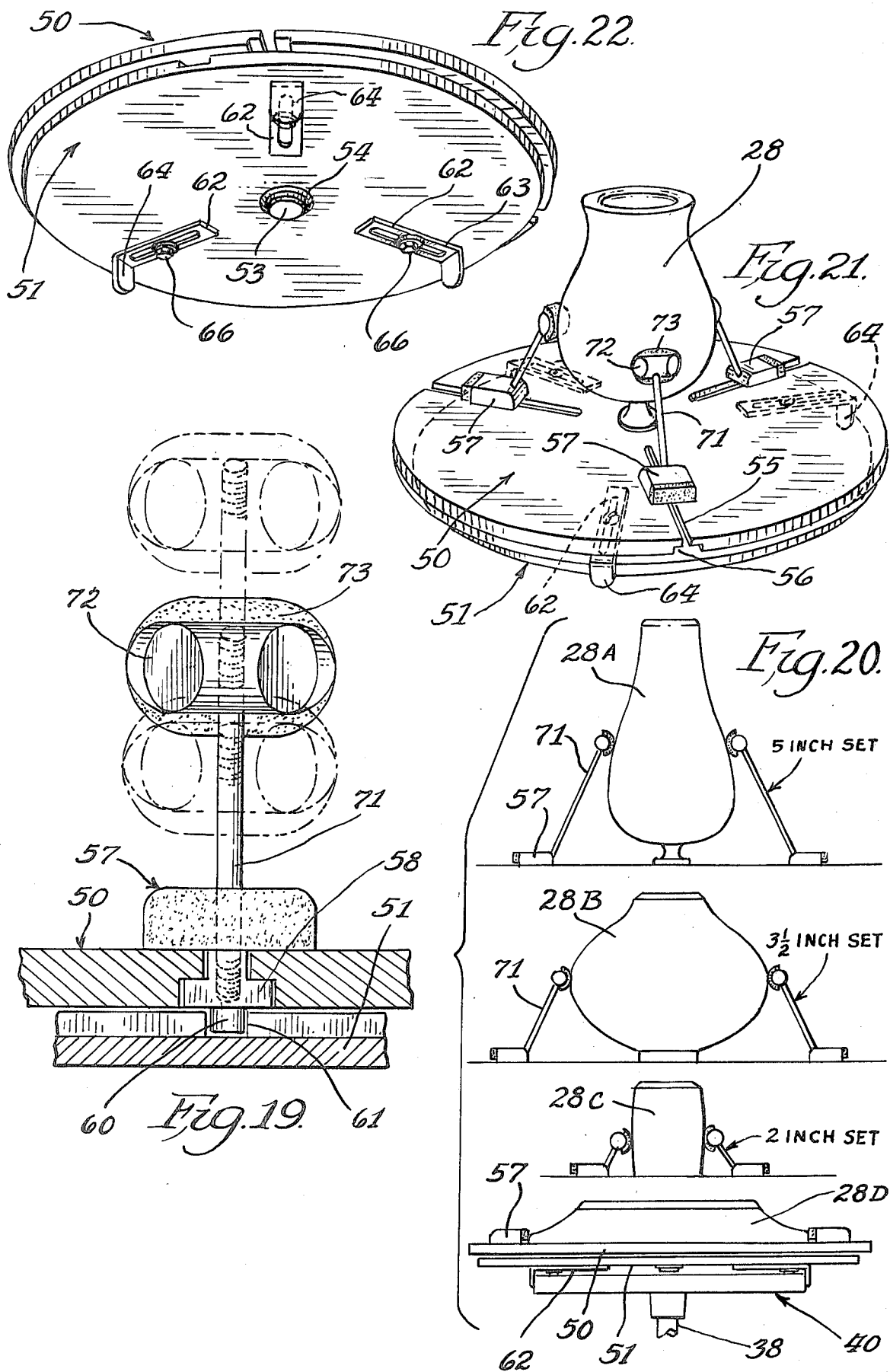

CENTERING AND HOLDING DEVICES FOR POTTER'S WHEELHEAD

The invention relates to equipment for use on the wheelhead of a potter's wheel and has more particular reference to a unique and efficient centering device for centering and holding the pot including a mass of clay and also the particular articles such as may be formed therefrom on the wheelhead of a potter's wheel whereby to facilitate the formation of the mass by the operator into a vase, bowl, plate or the like.

The centering apparatus of the invention is essentially a two plate device designed primarily for centering and holding a relatively hard pot such as a partially formed vase, bowl or plate on a potter's wheelhead to eliminate off-center rotation, wobble and the like whereby subsequent work by the operator is forming, shaping, and finishing the article are rendered more precise and accurate and the article is materially improved as regards its characteristics and also its appearance.

Accordingly one of the objects of the invention is to provide a relatively simple but practical device for attachment to a potter's wheelhead for centering and holding the pot on the wheelhead and which when once set up can be easily removed and reattached for subsequent operations.

Another objective of the invention is to provide a holding and centering device as described consisting essentially of a bottom plate having a top plate secured thereto and wherein a plurality of sliding arms are carried by the top plate and which have movement in radial slots as a result of a spiral formation provided by the bottom plate upon relative rotation of the plates.

Another object of the invention is to provide a two plate centering device as described adjustable clamping brackets on the underside of the bottom plate for releasable attachment of the device to the potter's wheelhead and which will also have a plurality of radial sliding arms movable in unison for engaging and holding the pot on the surface of the top plate.

A further object resides in providing a holder and centering device for attachment to the wheelhead of a potter's wheel and wherein the radial sliding arms for engaging and centering the pot are removable and replaceable for different heights of pots.

A further object is to provide a two plate centering device as described wherein the spiral formation on the surface of the bottom plate may be a spiral slot or a spiral rib and wherein special securing means are provided employing an O-ring for releasably securing the two plates together for the required operations for centering purposes.

With these and other objects in view, the invention may consist of certain novel features of construction and operations as will be more fully described and particularly pointed out in the drawings, specification and claims appended hereto.

In the drawings which illustrate an embodiment of the invention and wherein like reference characters are used to designate like parts, FIG. 1 is a view in perspective showing the top plate of the present centering device with the sliding arms riding in radial slots and with a pot in lifted position about to be placed on the top plate and then centered by the sliding arms, FIG. 2 is a view in perspective showing the pot in place on the top plate and with the sliding arms in contact therewith, FIG. 3 is a perspective view of the undersurface of the bottom plate of the present invention showing the securing bolt and nut for securing the top and bottom plates together and also showing the threadedly adjustable clamping brackets with inside points for engaging the rim of the potter's wheelhead, FIG. 4 is a perspective view of the top and bottom plates of the centering device showing the plates in separated relation with the sliding arms in the radial slots in the top plate and also showing the spiral formation of the grooves in the surface of the bottom plate, FIG. 5 is a bottom view of the top plate as shown in FIGS. 1, 2 and 4 but without the sliding arms, FIG. 6 is a top plan view of the bottom plate as shown in FIGS. 3 and 4 to better illustrate the formation of the spiral grooves, FIG. 7 is a vertical sectional view taken substantially diametrically of the two plates when secured together and showing the sliding arms in contact with a pot in centered position on the top plate and also showing the clamping brackets with the inside points in contact with the rim of the wheelhead, FIG. 8 is a side elevational view of a sliding arm and showing in section a pair of spiral grooves with one accomodating the depending stud member of the sliding arm, FIG. 9 is a rear sectional view of the sliding arm of FIG. 8, FIG. 10 is a side elevational view similar to FIG. 8 but showing a modified form of sliding arm for use with a bottom plate having a spiral formation of ribs or protuberances in the place of the spiral grooves, FIG. 11 is a perspective view showing a bowl on the top plate of the present centering device being held by the sliding and centering arms, FIG. 12 is a vertical sectional view taken along line 12—12 of FIG. 11, FIG. 13 is a perspective view of the sliding arm as in FIG. 11, FIG. 14 is a rear elevational view of the sliding arm of FIG. 13, FIG. 15 is a generally sectional view illustrating a modified form of centering device comming within the invention, FIG. 16 is a vertical sectional view taken on line 16—16 of FIG. 15, FIG. 17 is a vertical sectional view taken on line 17—17 of FIG. 15, FIG. 18 is a perspective view of one of the clamping brackets as shown in FIG. 15, FIG. 19 is an elevational view, parts in section, taken on line 19—19 of FIG. 15 and showing the variation in height made possible by these sliding arms, FIG. 20 is a group of elevational views showing pots of various shapes such as vases, bowls and plates and wherein each pot is held by sliders of the appropriate heigth, FIG. 21 is a perspective view showing a vase in center position on the top surface of a centering device and which is being held by sliding arms of the proper height for such an article, and FIG. 22 is a perspective view showing the undersurface of the bottom plate of the centering device of FIG. 21.

Referring to the drawings and in particular to FIGS. 1 to 6 inclusive, the centering and holding device of the invention is shown as including a top plate 10 and a bottom plate 11, the said plates being made of wood, plastic or other suitable material and the plates releasably secured together by the center screw 12, the washer 13 and the nut 14, as shown in FIG. 3. The plates are circular, of substantially the same size although the top plate may be somewhat larger. The central securing screw 12 and the nut 14 hold the plates together in a manner permitting relative rotation until the screw is tightened. The top plate 10 is provided with a plurality of radial slots 15, more specifically three, and which extend in a direction outwardly from close to the center screw 14 to the periphery. The slots are the same in width and in length and each slot is undercut at 16, see FIGS. 1, 2 and 5, so that each slot has a greater width on the undersurface than on the top surface of the top plate.

A sliding arm designated generally by numeral 17 is adapted to move in each radial slot and a conventional type of sliding arm may include an arcuate upright extending portion 18, FIGS. 8 and 9, which terminates in a pot contacting face member 20 and which may be cushioned at 21. Also each sliding arm includes a pair of base flanges 22 which ride on the surface of the top plate during movement of the arm, and each arm has a depending extension, the same terminating in the guiding lug 23. The lug is adapted to ride in spiral grooves formed in the top surface of the bottom plate, which structure will now be described.

Referring to the bottom plate 11, the said plate on its top surface has a spiral formation formed in the same and which may be a spiral groove 25 or a spiral formation of ribs or protuberances 26. As regards the grooves, three separate and independent spiral grooves are provided 25A, 25B and 25C and each spiral groove terminates in an entrance-exit opening 27. When the plates 10 and 11 are properly assembled, the guiding lugs 23 of three sliding arms are adapted respectively, to ride in a groove 25 and with relative rotation of the plates the arms are caused to move in their slots in a radial direction. With inward movement of the radial arms 17 they will engage and hold a pot such as 28 FIGS. 2, 7 and 11 on the surface of the top plate. By reason of the special formation of the grooves, for example, each sliding arm will move the same distance upon a certain extent of relative rotation of the plates and the three arms will move in unison. In other words, the arms move in unison and to a like extent. When the bottom plate is provided with sprial ribs in the place of grooves, a sliding arm 29, FIG. 10, must be employed having a pair of spaced guiding lugs 30 for engaging a rib such as 26 on respective sides.

The bottom plate 11 of the present centering device is also provided with a plurality of clamping brackets 34 on its undersurface, three being shown in FIGS. 3 and 7. Each bracket 34 has a sharp point 35 on its inside surface and the brackets are threadedly adjustable in a radial direction by reason of the threaded screws 36 which are threded in the fixed lugs 37, preferably of metal, the said lugs being fixedly secured in spaced relation on the undersurface of the bottom plate. The brackets 34 are employed for mounting the centering device on a potter's wheelhead such as 40, FIG. 7, the wheelhead being supported and rotated by the shaft 38. The lugs 37 will rest on the wheelhead which locates the depending end of the brackets for contact with the rim of the wheelhead and which is made more secure and definite by the sharp points 35. The operator has access to the screws 36 and by adjustment of the same the operator can precisely center the device on the wheelhead. When this has been accomplished, the operator can then center the pot 28 on the top surface of the plate 10. This requires that the top plate be rotated in the required direction to move the sliding arms 17 outward to permit the placing of the pot on the plate and then the same is rotated in a reverse direction to move the arms inwardly to contact the pot and center the same on the device.

In FIG. 11 the pot 28 may be a bowl or even a plate in which case a modified form of sliding arm is employed designated by numeral 42. Each arm moves in a radial slot as previously described and each arm includes a face portion 43 cushioned at 44 and a flanged part 45 which is adapted to ride in the apace provided by the undercut 16 associated with each radial slot 15. The guiding lug 46 depends from the flanged part and the lug rides in a groove as shown in FIG. 12.

A modified form of centering and holding device coming within the invention is shown in FIGS. 15 to 22 inclusive. The top plate 50 and the bottom plate 51 are circular with the top plate being somewhat larger in size and the two plates are held in operative relation by the unique arrangement shown in FIG. 17. The screw 52 passes through the top plate and is threaded in the metal part 53 located in the bottom plate. The depending end of the part 53 is grooved for receiving the O-ring 54. The screw 52 can be glued in place in the metal part 53 and the arrangement holds the plates together permitting relative rotation although the operator can easily separate them merely by removing the O-ring. The top plate has a plurality of radial slots 55 formed in the same and each slot is undercut at 56. The sliding arms 57 ride in the radial slots and each arm has a flanged part 58 providing a guiding lug 60 for co-action with a spiral groove 61 as shown in FIG. 19.

The bottom plate 52 in addition to having grooves formed in the same, carried on its bottom surface the mounting and clamping brackets 62. Each bracket has an elongated part 63 and a right-angled part 64 which depends downwardly as shown in FIG. 18. The part 63 is apertured to provide an elongated slot 65. In FIG. 22, three of the brackets 62 are shown and as regards each bracket the same is securely but releasably held to the undersurface of the bottom plate by the screws 66 which pass through the elongated slots 65, respectively. The brackets are accordingly adjustable in a radial direction and the depending part 64 is adapted to engage and clamp onto the rim of a potter's wheelhead in a manner as described and as shown in FIG. 15. After the centering device has been precisely centered on the wheelhead, the same can be secured in position by tightening the nuts 67 which are threaded on the screws 66.

The sliding arms 57 as best shown in FIGS. 15, 19 and 20 may be bored or apertured to form an angular opening 70 for receiving the extension rods 71. Each rod may have a tight fit in its opening or the rods may be threaded in the openings. At the opposite top end of each extension rod 71 there is provided a head part or pot contacting part 72 which may be cushioned as at 73. In accordance with the invention, the rods will vary in length so as to accomodate pots of various heights and size. In FIG. 20 the pot 28A is typical of a rather tall vase and so the extension rods are relatively long having a length of about five inches, For the shorter pots shorter extension rods can be used as illustrated for pots 28B and 28C, and finally for plates 28D the rods are eliminated entirely.

What is claimed is:

1. In a centering and holding device for attachment to a potter's wheelhead, a bottom plate having a plurality of clamping brackets on its undersurface and also having a spiral formation on its top surface, a top plate adapted to be releasably secured to the bottom plate centrally of the plates, whereby said releasable securement of the plates is such as to permit relative rotation of the plates, a plurality of radial slots in the top plate extending through the plate from the top surface to the bottom and from a short distance spaced outwardly from the center to the periphery, a sliding arm positioned in each radial slot and having a depending portion of sufficient length to engage and co-act with the spiral formation on the top surface of the bottom plate, said releasable securement of the top plate with the bottom plate being provided by a collar member depending from the under surface of the top plate centrally thereof, said bottom plate having a central opening for receiving the collar member and which extends through the same to project a short distance below the bottom plate, a groove provided in the projecting end of the collar member, and an O-ring located in the groove.

* * * * *